United States Patent
Lei et al.

(10) Patent No.: US 11,167,370 B2
(45) Date of Patent: Nov. 9, 2021

(54) METHOD OF RESISTANCE SPOT WELDING OF GALVANIZED HIGH-STRENGTH STEEL WITH GOOD JOINT PERFORMANCE

(71) Applicant: BAOSHAN IRON & STEEL CO., LTD., Shanghai (CN)

(72) Inventors: Ming Lei, Shanghai (CN); Hua Pan, Shanghai (CN); Dungui Zuo, Shanghai (CN); Yongchao Su, Shanghai (CN); Haomin Jiang, Shanghai (CN); Lei Shi, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 176 days.

(21) Appl. No.: 16/342,263

(22) PCT Filed: Sep. 30, 2017

(86) PCT No.: PCT/CN2017/104710
§ 371 (c)(1),
(2) Date: Apr. 16, 2019

(87) PCT Pub. No.: WO2018/082425
PCT Pub. Date: May 11, 2018

(65) Prior Publication Data
US 2019/0321907 A1     Oct. 24, 2019

(30) Foreign Application Priority Data
Nov. 4, 2016  (CN) .......................... 201610963996.5

(51) Int. Cl.
*B23K 11/11*     (2006.01)
*B23K 11/16*     (2006.01)
*B23K 11/24*     (2006.01)

(52) U.S. Cl.
CPC .......... *B23K 11/115* (2013.01); *B23K 11/241* (2013.01)

(58) Field of Classification Search
CPC .... B23K 11/11–115; B23K 11/16–166; B23K 2103/02–05
See application file for complete search history.

(56) References Cited

U.S. PATENT DOCUMENTS

| | | | | |
|---|---|---|---|---|
| 4,503,311 A | * | 3/1985 | Houchens ............ | B23K 11/256 219/109 |
| 4,678,887 A | * | 7/1987 | Nagel .................. | B23K 11/252 219/110 |

(Continued)

OTHER PUBLICATIONS

English translation of CN 104722905 (Year: 2015).*

*Primary Examiner* — Michael A LaFlame, Jr.
(74) *Attorney, Agent, or Firm* — Abelman, Frayne & Schwab

(57) ABSTRACT

A resistance spot welding method of galvanized high-strength steel with good joint performance, in which three welding pulses are used within one spot welding schedule. The method includes applying a first welding pulse and a second welding pulse which are used for generating a nugget and suppressing the generation of liquid metal embrittlement (LME) cracks, respectively. The first welding pulse generates a nugget having a diameter of $3.75T^{1/2}$-$4.25T^{1/2}$ in which T represents a plate thickness. The second welding pulse causes the nugget to grow at a rate less than a rate of growth during the first welding pulse. A third welding pulse, which is a tempering pulse, is applied for improving plasticity of a welding spot.

4 Claims, 3 Drawing Sheets

(56) References Cited

U.S. PATENT DOCUMENTS

| | | | | |
|---|---|---|---|---|
| 2005/0045597 A1* | 3/2005 | Wang | ................... | B23K 11/253 |
| | | | | 219/110 |
| 2014/0367368 A1* | 12/2014 | Yang | .................... | B23K 11/115 |
| | | | | 219/91.22 |
| 2015/0174688 A1* | 6/2015 | Yoo | ....................... | B23K 11/16 |
| | | | | 219/111 |
| 2016/0016252 A1* | 1/2016 | Edwards, II | ......... | B23K 11/115 |
| | | | | 219/91.1 |
| 2016/0144451 A1* | 5/2016 | Fujimoto | ............. | B23K 11/115 |
| | | | | 219/92 |
| 2017/0348798 A1* | 12/2017 | Watanabe | .............. | H02M 7/48 |

* cited by examiner

METHOD OF RESISTANCE SPOT WELDING OF GALVANIZED HIGH-STRENGTH STEEL WITH GOOD JOINT PERFORMANCE

FIELD OF THE INVENTION

The invention relates to a welding method of auto steel sheet, and in particular to a resistance spot welding method of galvanized steel sheets with tensile strength no less than 590 Mpa.

BACKGROUND OF THE INVENTION

In recent years, as the oil price soars and people's awareness on energy conservation, environmental protection and safety of the whole vehicle continuously enhances, various weight-lighting technologies of a vehicle body have been widely used in the automobile manufacturing industry. On this basis, the utilization ratio of high-strength steel on the vehicle body is higher and higher. Resistance spot welding has been widely used in the automotive industry due to the advantages of high production efficiency and easy automation implementation and the like, and will continue to be the main welding method of high-strength steel plates in the automotive industry. Therefore, resistance spot welding technology of high-strength steel is widely focused.

The joint of high-strength steel galvanized plates tends to occur following two problems during spot welding:
1. The joint occurs liquid metal embrittlement cracks, referred to LME cracks.
2. The joint tends to occur full interfacial fracture.

With respect to the problem on the LME cracks, no relevant patent is applied after searching in domestic. Since the problem is a research hotspot in the industry in past two years, research literatures on its influencing factors and sensitivities have been published now and then. In a Document named "liquid metal embrittlement-free welds of Zn-coated twinning induced plasticity steels" by RouholahAshiri et al. published on the ScriptaMaterialia (ScriptaMaterialia 114 (2016) 41-47), a spot welding solution with two weld pulses adopted for 1.2 mm hot-dip galvanized TWIP steel can effectively suppress generation of LME cracks in the spot welding. The process is shown in FIG. 1. The first pulse is used for generating a nugget having a basic size, and the second pulse is used for slowly growing the nugget to reduce a residual stress.

In view of the brittleness of the welding spot of high-strength steel, a solution with tempering pulse during the welding process is generally used in the industry to improve the plasticity of the welding spot and to improve fracture mode of the welding spot during fracture testing. A specific setting mode of the tempering pulse is generally obtained through physical tests by an orthogonal method. A result of relevant patent search is as follows: "A method for improving mechanical property of a joint in welding spot of advanced high-strength steel" (Patent No. CN102489859A): nugget metal grains are refined by using a method with inoculant alloy paste, so that the tissues of the joints are improved to improve the mechanical property of a joint in welding spot of the advanced high-strength steel; "A resistance-laser hybrid spot welding method for High-strength steel" (CN102500936A): the performance of a joint of the high-strength steel is improved by means of a composite connection mode of a laser welding and a spot welding.

SUMMARY OF THE INVENTION

The purpose of the present invention is to provide a resistance spot welding method of galvanized high-strength steel with good joint performance, which can improve the plasticity of joint and increase the probability of button pullout failure of the welding spot during detection of the fracture while suppressing the generation of liquid metal embrittlement (LME) cracks during the spot welding of high-strength steel galvanized plates.

In order to achieve the above technical purpose, the present invention adopts the following technical solution:

A resistance spot welding method of galvanized high-strength steel with good joint performance, three welding pulses are used within one spot welding schedule; the first welding pulse and the second welding pulse are used for generating a nugget and suppressing the generation of liquid metal embrittlement (LME) cracks, wherein the first welding pulse generates a nugget having a diameter of $3.75T^{1/2}$-$4.25T^{1/2}$, and T represents a plate thickness; the second welding pulse causes the nugget to grow slowly; and a third welding pulse is a tempering pulse, which is used for improving the plasticity of a welding spot.

A time t1 of the first welding pulse is set and a welding current I1 of the first welding pulse is obtained through tests, and the welding current I1 of the first welding pulse is a welding current upon generating the nugget having the diameter of $3.75T^{1/2}$-$4.25T^{1/2}$; and a welding current I2 and a time t2 of the second welding pulse and a welding current I3 and a time t3 of the third welding pulse are calculated by the welding current I1 and the time t1 of the first welding pulse.

By the resistance spot welding method of galvanized high-strength steel with good joint performance of the present invention, the LME cracks during the spot welding of high-strength steel galvanized plates can be effectively suppressed, and the plasticity of the welding point can also be improved. According to the resistance spot welding method of the present invention, three welding pulses are used within one spot welding schedule, the first and second pulses are used for generating the nugget and suppressing the generation of the LME cracks, and the third welding pulse is the tempering pulse, which is used for improving the plasticity of the welding point, so that the fracture mode of the welding spot during the broken testing is improved.

In addition, the spot welding method provided by the present invention clarifies a setting method of the welding currents I and the times t in the three welding pulses and a mathematical relationship therebetween, and the welding current I2 and the time t2 of the second welding pulse and the welding current I3 and the time t3 of the third welding pulse can be conveniently calculated by the welding current I1 and the time t1 of the first welding pulse obtained through a few tests, so that a spot welding process, which can not only suppress the LME cracks during the spot welding of the high-strength steel galvanized plates, but also can improve the plasticity of the welding point, is implemented.

By the resistance spot welding method of galvanized high-strength steel of the present invention, the liquid metal embrittlement (LME) cracks during the spot welding of the high-strength steel galvanized plates can be effectively suppressed, meanwhile, the plasticity of the welding point is improved, and the probability of button pullout failure of the welding point during broken testing is increased. Therefore, the joint by spot welding of the high-strength steel galvanized plates with more reliable quality and more excellent performance is obtained, and a useful guidance can be provided for the welding production of the high-strength steel galvanized plates.

DETAILED DESCRIPTION OF THE EMBODIMENTS

The present invention will be further described below in conjunction with the accompanying drawings and a specific embodiment.

The present invention discloses a resistance spot welding method of galvanized steel plates with a tensile strength no less than 590 Mpa. By the method, the plasticity of welding spot can be improved, and the probability of button pullout failure of the welding spots during broken testing can be increased while the generation of liquid metal embrittlement (LME) cracks during the spot welding of high-strength steel galvanized plates are suppressed.

Figure 1:
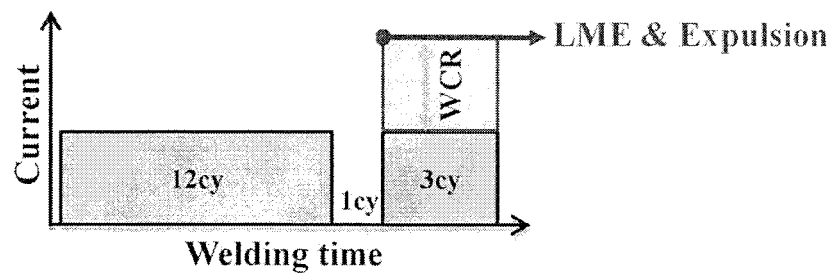
FIG. 1 is a schematic view of process parameters for suppressing LME cracks during spot welding of TWIP steel galvanized plates in the Document.
Figure 2:
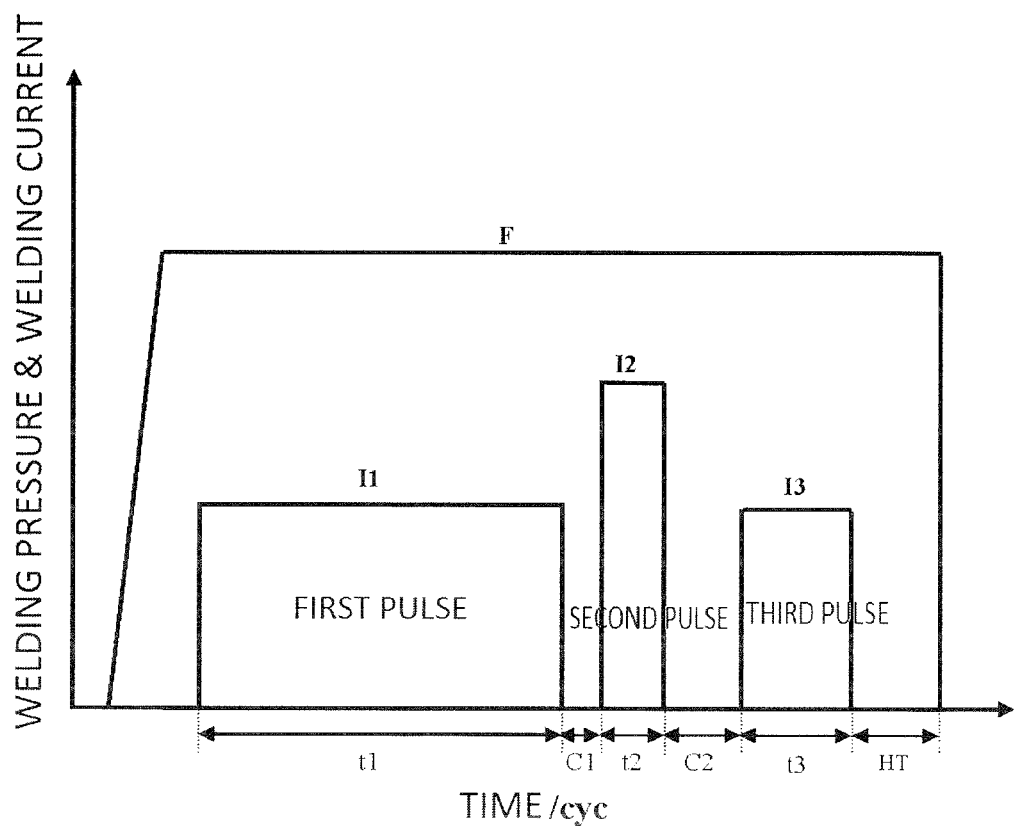
FIG. 2 is a schematic view of a resistance spot welding method of galvanized high-strength steel with good joint performance according to the present invention.

As shown in FIG. 2, in a resistance spot welding method of galvanized high-strength steel with good joint performance, three welding pulses are used within one spot welding schedule; a first welding pulse and a second welding pulse are used for generating a nugget and suppressing the generation of LME cracks, wherein the first welding pulse generates a nugget having a diameter of $3.75T^{1/2}$-$4.25T^{1/2}$, and T represents a plate thickness; the second welding pulse causes the nugget to grow slowly; and a third welding pulse is a tempering pulse, which is used for improving the plasticity of a welding spot.

A time t1 of the first welding pulse is set, and the welding current I1 of the first welding pulse is obtained through tests, and the welding current I1 of the first welding pulse is a welding current upon generating the nugget having the diameter of $3.75T^{1/2}$-$4.25T^{1/2}$ (T=plate thickness). A welding current I2 and a time t2 of the second welding pulse and a welding current I3 and a time t3 of the third welding pulse are calculated by the welding current I1 and the time t1 of the first welding pulse.

In the present invention, the welding current I2 and the time t2 of the second welding pulse and the welding current I3 and the time t3 of the third welding pulse can be conveniently calculated by the welding current I1 and the time t1 of the first welding pulse obtained through a few tests, so that the spot welding process, which can not only suppress the LME cracks during the spot welding of the high-strength steel galvanized plates, but also can improve the plasticity of the welding spot, is implemented.

The working principle of the resistance spot welding method of galvanized high-strength steel with good joint performance of the present invention is as follows:

A stress and a suitable temperature range (the range of the galvanized high-strength steel is 700° C. to 950° C.) are two necessary conditions for the generation of the LME cracks. The galvanized high-strength steel has the above two conditions in a spot welding process, and thus generates the LME cracks.

Figure 3:
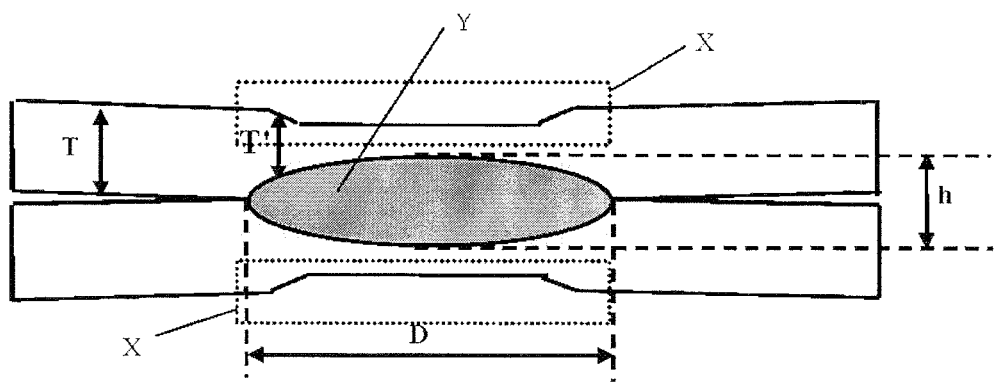
FIG. 3 is a schematic view of a section of resistance spot welding of galvanized high-strength steel.

The design idea of the present invention is to avoid the occurrence of the LME cracks by reducing the stress level of a spot welding LME crack sensitive region X, as shown in FIG. 3. The specific principle is as follows: with the increase of heat input during the spot welding, a diameter D and a height h of the nugget Y increase continuously. Since the high-strength steel, especially ultra-high-strength steel, has the addition of more alloy elements to a base material, it has high electrical resistivity, the heat generation speed during the spot welding is high, and the nugget grows at a high speed. The height h of the nugget grows too fast, so that the thickness T' of the unmelted base material in a plate thickness direction is rapidly decreased, and the size of the thickness T' of the unmelted base material directly affects the cross-sectional area under a load. Therefore, the smaller the thickness T' of the unmelted base material is, the greater the stress is.

In the present invention, the nugget having the diameter of $3.75T^{1/2}$-$4.25T^{1/2}$ (T=the plate thickness) is generated by the first welding pulse. At this time, the nugget is relatively small, the thickness T' of the unmelted base material is relatively large, and no LME crack of spot welding is generated. Then, the second welding pulse with a short time t2 is applied to slowly grow the nugget, thus reducing the decrease speed of the thickness T' of the unmelted base material so as to reduce the stress level of the LME crack sensitive region and avoid the occurrence of the LME cracks.

The improvement of the plasticity of the welding spot and the increased probability of button pullout failure of the welding spot during the broken testing are achieved by the third welding pulse. The pulse is the tempering pulse, which can effectively reduce the cooling speed of the region of the nugget and reduce the generation of a hardened structure of the joint, thereby improving the plasticity of the joint.

Test Implementing Steps:

1 Basic parameter settings:

1.1 An electrode having andomed surface with ϕ6 mm (plate thickness ≤1.4 mm) or ϕ8 mm (plate thickness >1.4 mm) is used.

Figure 4:
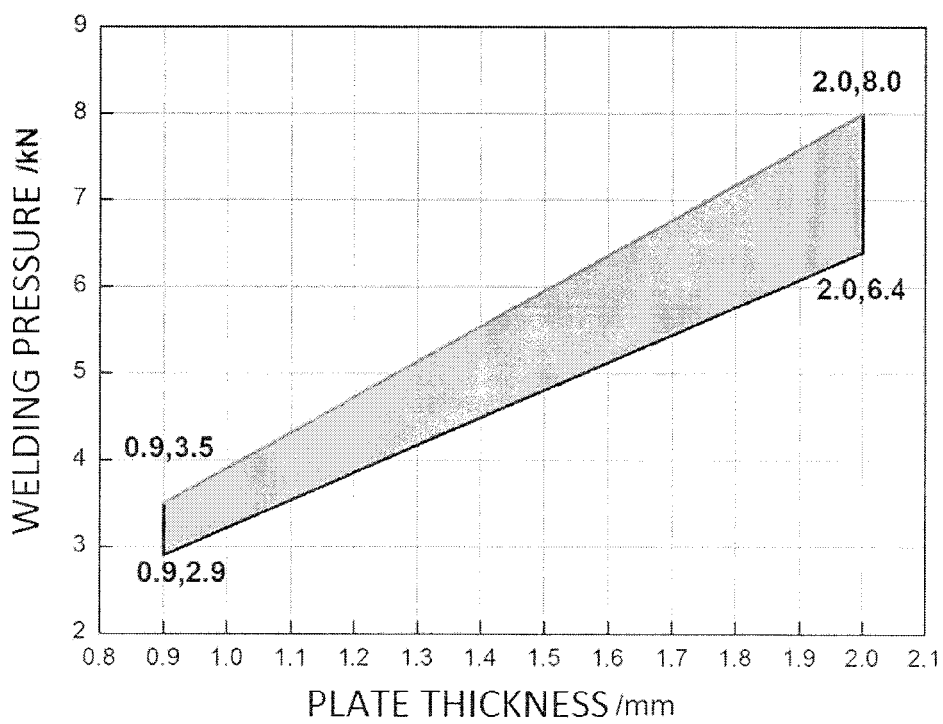
FIG. 4 is a schematic view of the relationship between a plate thickness and a welding pressure.

1.2 The welding pressure is set within an enclosed region as shown in FIG. 4 according to the plate thickness. A specific method of setting a value of the welding pressure is as follows: the lower limit of the welding pressure Fmin=3.182T+0.0364 kN (wherein T represents the plate thickness, its unit is mm, and the range of T is 0.9 mm-2.0 mm); the upper limit of the welding pressure Fmax=4.091T-0.182 kN (wherein T represents the plate thickness, its unit is mm, and the range of T is 0.9 mm-2.0 mm).

1.3 Flow rate of cooling water: 2 L/min-4 L/min.

1.4 The time of C1, C2 and HT (holding time) in FIG. 2 is set according to Table 1. The interval time between the first welding pulse and the second welding pulse is C1, that is, a first cooling time C1, the interval time between the second welding pulse and the third welding pulse is C2, that is, a second cooling time C2, the holding time HT is a time after the third welding pulse, and their values for steel plates with different thicknesses are respectively set as follows:

TABLE 1

| Plate thickness/mm | C1 | C2 | HT |
|---|---|---|---|
| 0.9-1.2 | 1 cyc | 8 cyc | 5 cyc |
| 1.3-1.6 | | 10 cyc | |
| 1.7-2.0 | | 12 cyc | |

Wherein: cyc represents the time unit, which is a cycle, 1 cyc = 0.02 seconds;

Wherein: cyc represents the time unit, which is a cycle, 1 cyc=0.02 seconds;

2 Setting of the first welding pulse:

2.1 The time t1 of the first welding pulse is set according to the plate thickness, and a specific setting method is as follows:
Plate thickness 0.9-1.2 mm: t1: 8-12 cyc;
Plate thickness 1.3-1.6 mm: t1: 10-15 cyc;
Plate thickness 1.7-2.0 mm: t1: 12-18 cyc.

2.2 The welding current I1 of the first welding pulse is set. A nugget having a diameter of $3.75T^{1/2}$-$4.25T^{1/2}$ (T=plate thickness) is generated. The setting steps of the welding current I1 of the first welding pulse are as follows:

2.2.1 The electrode, the pressure, the flow rate of cooling water and the HT are set according to "1 basic parameter setting". C1 and C2 are set as 0.

2.2.2 t1 is set according to the method of "2.1".

2.2.3 Starting from 4 kA, the welding current I1 of the first pulse is sequentially set with 400 A as a step length, and two spot welding samples are welded under each current.

2.2.4 The spot welding samples in 2.2.3 are destroyed by using a peeling method.

2.2.5 The diameter of the nugget of the welding spot of each spot welding sample that is destroyed in step 2.2.4 is measured by using a vernier caliper.

2.2.6 The diameters of the nuggets of the two welding spots under the same welding current is averaged, and the corresponding current when the averaged value is closest to the $3.75T^{1/2}$-$4.25T^{1/2}$ (T=plate thickness) is the "welding current I1 of the first pulse".

3 Setting of the time t2 of the second welding pulse and the time t3 of the third welding pulse:

3.1 The electrode, the pressure, the flow rate of cooling water, C1, C2 and HT are set according to "1 basic parameter setting".

3.2 The t2 and t3 are set according to the plate thickness through the t1, and a specific method is as follows:
Plate thickness 0.9-1.2 mm: t1: 8-12 cyc;

$$t2 = \frac{t1}{4}; t3 = \frac{t1}{4} + 1.$$

Plate thickness 1.3-1.6 mm: t1: 10-15 cyc;

$$t2 = \frac{2t1}{5} - 2; t3 = \frac{t1}{5} + 2.$$

Plate thickness 1.7-2.0 mm: t1: 12-18 cyc;

$$t2 = \frac{t1}{3}; t3 = \frac{t1}{3} + 1.$$

4 Setting of the welding current I2 of the second welding pulse and the welding current I3 of the third welding pulse:

4.1 The welding current I2 of the second welding pulse is set according to the welding current I1 of the first welding pulse. The diameter of the nugget is caused to grow slowly, and it is ensured that no welding spatter occurs. A setting method of the welding current I2 of the second welding pulse is as follows:

Lower limit of I2: I2 min=(1.3−0.05t2)I1, wherein t2 is the time of the second welding pulse (unit: cyc);

Upper limit of I2: I2 max=(2.2−0.1t2)I1, wherein t2 is the time of the second welding pulse (unit: cyc).

4.2 The welding current I3 of the third welding pulse is set according to the welding current I1 of the first welding pulse. Slow cooling processing is performed on the welding spot to reduce the generation of the hardened structure of the nugget and to improve the plasticity of the welding spot. A setting method of the welding current I3 of the third welding pulse is as follows:

Lower limit of I3: I3 min=⅔ I1

Upper limit of I3: I3 max=I1.

Embodiment

Spot welding is performed on 1.6 mm hot-dipped high-strength steel (the mechanical property and compositions are shown in table 2) by using three spot welding schedules No. 1, No. 2 and No. 3. The LME crack generations and the fracture modes of the welding spot during the broken testing are compared and evaluated. The characteristics and test results of the three spot welding schedules are shown in the Table 3.

TABLE 2

Compositions and mechanical property of galvanized high-strength steel

| Plate thickness | Mechanical property | | | Chemical composition % | | | | |
|---|---|---|---|---|---|---|---|---|
| | Yield strength | Tensile strength | Elongation at fracture | C | Si | Mn | P | S |
| 1.6 mm | 715 Mpa | 1020 Mpa | 20% | 0.2 | 1.5 | 1.8 | 0.01 | 0.002 |

TABLE 3

Characteristics and results of Spot welding processes No. 1, No. 2 and No. 3

| Process serial number | Process characteristics | Test result |
|---|---|---|
| No. 1 | Conventional spot welding process | The welding spot generates severe LME cracks |
| No. 2 | The third welding pulse is zero, and the remaining processes are set according to the spot welding method of the present invention | The ratio of interfacial fracture at welding spot during the broken testing is high |
| No. 3 | The spot welding method according to the present invention is adopted | No spot welding LME crack is generated, and the ratio of interfacial fracture at the welding spot during the broken testing is greatly reduced |

The detailed results are as follows:
1. Results by the Spot Welding Process No. 1:
   The spot welding process No. 1 is specifically as shown in Table 4:

TABLE 4

| | | | | | | | | | | | |
|---|---|---|---|---|---|---|---|---|---|---|---|
| | | | \multicolumn{2}{c}{Spot welding process No. 1} | | | | | | | |

| Plate thickness | Diameter of end surface of electrode | Welding pressure | First pulse Time | First pulse Current | First cooling time | Second pulse Time | Second pulse Current | Second cooling time | Third pulse Time | Third pulse Current | Holding time | Flow rate of cooling water |
|---|---|---|---|---|---|---|---|---|---|---|---|---|
| 1.6 mm | 6 mm | 3.6 KN | 6 cyc | $I_1$ | 1 cyc | 6 cyc | $I_2$ | 1 cyc | 6 cyc | $I_3$ | 5 cyc | 2 L/min |

Note:
$I_1 = I_2 = I_3$ in the table

Figure 5:
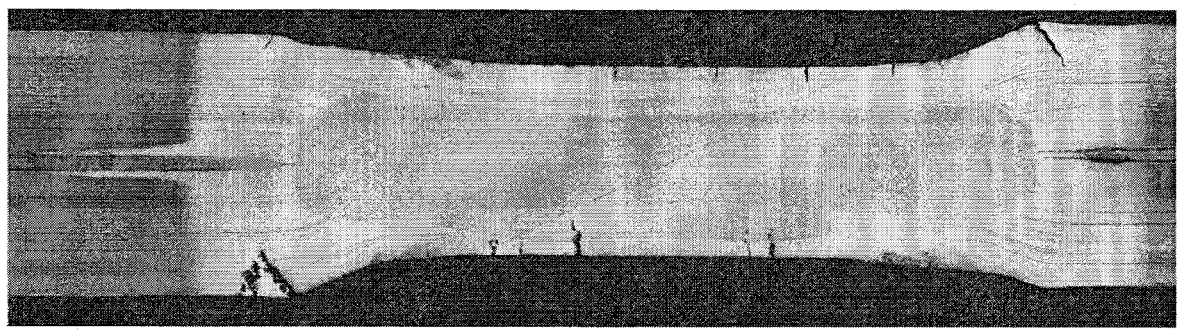
FIG. 5 is a metallograph of a typical spot welding section with a process No. 1 (conventional spot welding process) in an embodiment.

Through the metallographic, severe liquid metal embrittlement (LME) cracks are found in the entire welded region. FIG. 5 is a typical metallograph thereof.

2. Results by the Spot Welding Process No. 2:
   The spot welding process No. 2 is as follows:

TABLE 5

| Plate thickness | Diameter of end surface of electrode | Welding pressure | First pulse Time | First pulse Current | First cooling time | Second pulse Time | Second pulse Current | Second cooling time | Third pulse Time | Third pulse Current | Holding time | Flow rate of cooling water |
|---|---|---|---|---|---|---|---|---|---|---|---|---|
| 1.6 mm | 8 mm | 5.5 kN | 15 cyc | 8.0 kA | 1 cyc | 4 cyc | 8.8-14.4 kA | 0 | 0 | 0 | 5 cyc | 2 L/min |

By this welding method, during the broken testing, the fracture mode of the welding spot is mainly interfacial fracture. Although the tensile-shear strength (TSS) and cross tensile strength (CTS) of the welding spot meet the requirements, the welding spot after the TSS test is almost entirely with interfacial fracture, and the ratio of interfacial fracture after the CTS test is also less than 50%.

3. Results by the Spot Welding Process No. 3:
   The spot welding process No. 3 is as follows:

TABLE 6

| Plate thickness | Diameter of end surface of electrode | Welding pressure | First pulse Time | First pulse Current | First cooling time | Second pulse Time | Second pulse Current | Second cooling time | Third pulse Time | Third pulse Current | Holding time | Flow rate of cooling water |
|---|---|---|---|---|---|---|---|---|---|---|---|---|
| 1.6 mm | 8 mm | 5.5 kN | 15 cyc | 8.0 kA | 1 cyc | 4 cyc | 8.8-14.4 kA | 10 cyc | 5 cyc | 5.3 kA | 5 cyc | 2 L/min |

Figure 6:
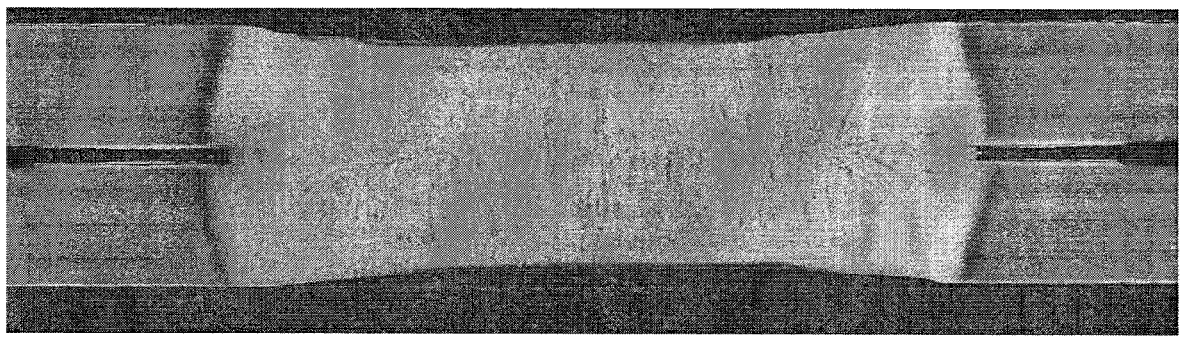
FIG. 6 is a metallograph of a typical spot welding section of a process No. 3 (the spot welding method of the present invention) in an embodiment.

By this method, the liquid metal embrittlement (LME) crack is not found in the entire welded region through the metallographic. The typical metallograph thereof is as shown in FIG. 6.

At the same time, by this process, the tensile-shear strength (TSS) and cross tensile strength (CTS) of the welding spot meet the requirements, the fracture mode detected after the CTS test is all button pullout failure, and the ratio of button pullout failure at the welding spot detected after the TSS detection is also above 70%, which is much better than the result when the slow cooling pulse is not applied.

The above descriptions are only preferred embodiments of the present invention, and are not intended to limit the protection scope of the present invention. Therefore, any modifications, equivalents, improvements and the like made within the spirit and principle of the present invention should be encompassed within the protection scope of the present invention.

The invention claimed is:
1. A resistance spot welding method of galvanized high-strength steel, characterized by that:
   three welding pulses are used within one spot welding schedule;
   a first welding pulse and a second welding puke are used for generating a nugget and suppressing the generation of liquid metal embrittlement (LME) cracks, wherein the first welding pulse has a first current amperage magnitude and a pulse duration time t1 that generates a nugget having a diameter of $3.75T^{1/2}$-$4.25T^{1/2}$ in which T represents a plate thickness;

the second welding pulse has a second current amperage magnitude and a pulse duration time $t2$ that causes the nugget to grow at a rate less than a rate of growth during the first welding pulse; and a third welding pulse has a third current amperage magnitude and a pulse duration time $t3$ which is a tempering pulse used for improving plasticity of a welding spot, wherein the second current amperage magnitude of the second welding pulse is greater than the first and third current amperage magnitudes of the respective first and third welding pulses and the pulse duration time $t2$ less than the pulse duration time $t1$.

2. The resistance spot welding method of galvanized high-strength steel according to claim 1, wherein the time $t1$ of the first welding pulse is set and a welding current $I1$ of the first welding pulse is obtained through tests, and the welding current $I1$ of the first welding pulse is a welding current upon generating the nugget having the diameter of $3.75T^{1/2}$-$4.25T^{1/2}$; and a welding current $I2$ and the time $t2$ of the second welding pulse, and a welding current $I3$ and the time $t3$ of the third welding pulse are calculated by the welding current $I1$ and the time $t1$ of the first welding pulse.

3. The resistance spot welding method of galvanized high-strength steel according to claim 2, wherein for the plate thickness 0.9-1.2 mm, the time $t1$ of the first welding pulse is set as 8-12 cyc, wherein cyc represents a time unit, 1 cyc-0.02 seconds, and the welding current $I1$ of the first welding pulse is obtained through tests;

or the plate thickness 1.3-1.6 mm, the time $t1$ of the first welding pulse is set as 0-15 cyc, and the welding current $I1$ of the first welding pulse is obtained through tests;

for the plate thickness 1.7-2.0 mm, the time $t1$ of the first welding pulse is set as 12-18 cyc, and the welding current $I1$ of the first welding pulse is obtained through tests;

correspondingly:

for the plate thickness 0.9-1.2 mm, the time of the second welding pulse is set as $t2=t^{1/4}$;

the time of the third welding pulse is set as $t3=(t^{1/4})+1$;

for the plate thickness 1.3-1.6 mm, the time of the second welding pulse is set as $t2=(2t^{1/5})-2$;

the time of the third welding pulse is set as $t3=(t^{1/5})+2$;

for the plate thickness 1.7-2.0 mm, the time of the second welding pulse is set as $t2=t^{1/3}$;

the time of the third welding pulse is set as $t3=(t^{1/3})+1$;

according to the plate thickness, correspondingly, a specific, method of calculating $I2$ and $I3$ by $I1$ is as follows:

a specific setting method of the current $I2$ of the second welding pulse is as follows:

a lower limit of $I2$: $I2\ min=(1.3-0.05t2)I1$, an upper limit of $I2$: $I2\ max=(2.2-0.1t2)I1$;

a specific setting method of the current $I3$ of the third welding pulse current $I3$ is as follows:

a lower limit of $I3$: $I3\ min=2/3 I1$, an upper limit of $I3$: $I3\ max=I1$;

an interval time between the first welding pulse and the second welding, pulse is $C1$ which is a first cooling time, an interval time between the second welding pulse and the third welding pulse is $C2$ which is a second cooling time, a holding time (HT) is a time after the third welding pulse, and for steel plates with different thicknesses, values of $C1$, $C2$ and HT are respectively set as follows:

plate thickness 0.9-1.2 mm, $C1=1$ cyc, $C2=8$ cyc, HT=5 cyc;

plate thickness 1.3-1.6 mm, $C1=1$ cyc, $C2=10$ cyc, HT=5 cyc;

plate thickness 1.7-2.0 mm, $C1=1$ cyc, $C2=12$ cyc, HT=5 cyc.

4. The resistance spot welding method of galvanized high-strength steel according to claim 1, wherein the pulse duration time $t2$ is less than the pulse duration time $t3$.

* * * * *